(12) United States Patent
Morschheuser et al.

(10) Patent No.: US 8,007,033 B2
(45) Date of Patent: Aug. 30, 2011

(54) TRUCK COMPRISING A RETAINING SYSTEM FOR THE CAB IN CASE OF A COLLISION

(75) Inventors: Kay Morschheuser, Winterbach (DE); Wolfgang Pedrotti, Ostifildern (DE)

(73) Assignee: Daimler AG, Stuttgart (DE)

( * ) Notice: Subject to any disclaimer, the term of this patent is extended or adjusted under 35 U.S.C. 154(b) by 190 days.

(21) Appl. No.: 11/996,403

(22) PCT Filed: Jul. 11, 2006

(86) PCT No.: PCT/EP2006/006767
§ 371 (c)(1),
(2), (4) Date: Jul. 18, 2008

(87) PCT Pub. No.: WO2007/012398
PCT Pub. Date: Feb. 1, 2007

(65) Prior Publication Data
US 2008/0265621 A1   Oct. 30, 2008

(30) Foreign Application Priority Data
Jul. 23, 2005   (DE) .......................... 10 2005 034 465

(51) Int. Cl.
*B62D 33/067*   (2006.01)
(52) U.S. Cl. ................. 296/190.05; 180/89.14
(58) Field of Classification Search ............. 296/190.05, 296/190.06, 190.01, 190.04, 190.07, 190.08; 180/89.13–83.19
See application file for complete search history.

(56) References Cited

U.S. PATENT DOCUMENTS
3,958,659 A * 5/1976 Selman ............... 180/89.15

FOREIGN PATENT DOCUMENTS

| | | |
|---|---|---|
| DE | 195 80 267 T1 | 3/1996 |
| DE | 198 02 632 B4 | 8/1999 |
| EP | 0 584 541 A2 | 3/1994 |
| EP | 1 477 391 A2 | 11/2004 |
| JP | 57-147969 A | 9/1982 |
| JP | 6-115463 A | 4/1994 |
| JP | 6-286647 A | 10/1994 |
| JP | 7-223559 A | 8/1995 |
| JP | 9-58531 A | 3/1997 |
| JP | 10-45044 A | 2/1998 |
| JP | 11-59492 A | 3/1999 |
| WO | WO 95/23725 A1 | 9/1996 |

OTHER PUBLICATIONS

International Search Report dated Oct. 5, 2006 with English translation of relevant portion and PCT/ISA/237 with English translation of Supplemental Sheets (Fourteen (14) pages).
German Office Action dated Oct. 12, 2005 with English translation of relevant portion (Thirteen (13) pages).

* cited by examiner

*Primary Examiner* — Glenn Dayoan
*Assistant Examiner* — Melissa A Black
(74) *Attorney, Agent, or Firm* — Crowell & Moring LLP

(57) ABSTRACT

A truck has a driver's cab tiltably mounted above a drive train and coupled in an articulated fashion to a bottom chassis by a bearing. The drive train is attached to the chassis, and has a restraint system for the driver's cab. In the case of a head-on collision of the truck with an obstacle at the level of the driver's cab, the restraint system serves to absorb and deflect collision forces at the driver's cab. The restraint system includes a flexible coupling element that establishes a connection, which is resistant to tensile stress counter to the direction of travel, between the driver's cab and a front fixed part of the drive train located underneath it.

15 Claims, 1 Drawing Sheet

TRUCK COMPRISING A RETAINING SYSTEM FOR THE CAB IN CASE OF A COLLISION

BACKGROUND AND SUMMARY OF THE INVENTION

This invention relates to a truck having a driver's cab which is tiltably coupled in an articulated fashion by means of a driver's cab bearing to a chassis located underneath it. The driver's cab can as a result be pivoted away in the upward direction for maintenance and repair work in the engine compartment, and in the normal operating state, the cab is connected to the chassis by means of the bearing and anchoring devices as well as spring devices.

Such trucks have a driver's cab which is located at a relatively high position above the drive train and with which there is the risk that, when there is a head-on collision with an obstacle at the level of the driver's cab, the attachments of the driver's cab rupture and severe damage occurs to the driver's cab. This is due to the fact that the connecting points of the driver's cab do not have sufficient strength to withstand large collision forces. The driver's cab can therefore suffer considerable deformation in the event of a crash and, as a result, considerable injury to the vehicle occupants can also occur. The damage to the truck is considerable when there is such a head-on impact with, for example, a bridge abutment or a trailer of a truck traveling ahead, referred to as a platform collision, and frequently result in total write-offs. The driver's cab often has to absorb a very large amount of energy, which can be deflected only partially into the chassis before the driver's cab bearing ruptures. The driver's cab is often completely destroyed in such a case.

The invention relates to such a truck having a driver's cab which is located at a high position and is provided with a collision restraint system for the driver's cab. In order to avoid the problems described, it is, in fact, known to provide, in addition to the customary connecting points of the driver's cab in the closed state, a mechanical rigid anchoring between the driver's cab and the chassis as an additional restraint system. Such additional structures are costly owing to the difference in the level between the driver's cab and the fixed components of the chassis located beneath it, and are generally heavy. Also, owing to the need for tilting mobility of the driver's cab and relative mobility in order to provide suspension for the driver's cab they also require costly structures, for example using lever mechanisms, with a large number of individual components.

German document DE 195 80 267 T1 discloses a truck having a driver's cab which is tiltably mounted above a drive train and which is coupled in an articulated fashion with respect to a bottom chassis by means of a bearing, wherein the drive train is attached to the chassis. Furthermore, a restraint system is provided for the driver's cab, which restraint system is suitable, in the case of head-on collisions of the truck with an obstacle at the level of the driver's cab, for absorbing and deflecting collision forces at the driver's cab. The restraint system establishes a fixed connection between the driver's cab and a fixed part of the drive train located underneath it. In order to achieve the highest possible level of comfort for the driver in terms of suspension without sound vibrations being transmitted into the driver's cab from the frame, one of the stabilizer bearings on the vehicle is embodied as a bushing which behaves in a soft fashion in the longitudinal and transverse directions but in a rigid fashion in the vertical direction.

German document DE 198 02 632 B4 describes a utility vehicle having a vehicle frame and a driver's cab which is coupled in an articulated fashion to the vehicle frame so as to be tiltable at the front about a transverse axis. At the rear, the driver's cab is supported on a bridge crossbeam and locked. The bridge crossbeam is arranged centrally and symmetrically in its position relative to the driver's cab and serves to implement an elastic support and to lock the driver's cab to the vehicle frame. The bridge crossbeam is composed of a horizontally arranged cross chord with limbs which extend in a vertically oblique fashion downward to the vehicle frame. By way of the limbs, the crossbeam is mounted, by corresponding attachment elements, to the frame longitudinal beams. In the event of a head-on impact, the driver's cab is pushed rearward, in which case the bridge crossbeam is deformed as far as the vehicle frame without individual elements rupturing, and in the process it can effectively dissipate energy.

In contrast with the above, the present invention has the object of proposing a truck which is more resistant to head-on collisions at the level of the driver's cab and can be implemented with low additional complexity and cost.

This object is achieved with a truck having the features claimed.

Advantageous refinements and developments are also claimed.

The truck according to the invention has a driver's cab which is tiltably mounted above a drive train, and a restraint system for the driver's cab in the case of head-on collisions of the driver's cab with obstacles at the level of the driver's cab in order to absorb and deflect collision forces. The restraint system comprises a flexible coupling element which establishes a connection, which is resistant to tensile stress counter to the direction of travel, between the driver's cab and a front fixed part of the drive train located beneath it. The flexible coupling element which is resistant to tensile stress permits an effective mechanical coupling between a fixed part in the front, low-lying region of the engine compartment to the driver's cab located above it, for the purpose of deflecting collision forces without the possibility of the driver's cab tilting or the necessary intrinsic mobility of the drive train and of the driver's cab being adversely affected. The forces which act on the driver's cab are in this way passed on to the drive train, i.e. the drive engine, the gearbox, the cardan shaft and the rear wheel axle, and are absorbed by the latter. Flexibility of the coupling element is understood here to be freedom from bending which permits free tilting about the bearing of the driver's cab. Nevertheless, the coupling element is essentially resistant to tensile stress, i.e. it permits tensile forces to be transmitted from the driver's cab to the drive train. The loading on the driver's cab can therefore be taken up by the driver's cab structure without a large degree of expenditure and transmitted to the drive train with a greater degree of strength. In this way, even at relatively high impact speeds, excessive damage to the driver's cab is prevented. Crash situations at relatively high speeds can therefore be coped with better. The mounting and manufacture of the restraint system according to the invention are conceivably simple and require comparatively little space. The flexible coupling element which is resistant to tensile stress can in this context have different shapes and structures; for example the coupling element can be in the shape of a strap, cable, belt, chain or the like made of metallic or nonmetallic materials.

According to one advantageous refinement of the invention, the coupling element is attached to lateral longitudinal beams of the driver's cab or of a chassis of the driver's cab. In this way the collision forces from the front region of the driver's cab are applied directly to the coupling element even if the latter is attached to a rear section of the driver's cab. The coupling element therefore extends from a rear attachment point on the longitudinal beams obliquely toward the front and downward for connection to a fixed part of the drive train. The lateral longitudinal beams of the driver's cab structure which are rigid in the longitudinal direction prevent deformation of the driver's cab in the bottom region and the flexible coupling element can easily be attached to the longitudinal beams. As a result of the attachment to the longitudinal beams of the driver's cab, there is no need for additional attachment components on the bodywork of the driver's cab.

According to a further refinement of the invention, the coupling element is attached to an end region of a drive engine. Since the drive engine generally forms the frontmost component of a drive train of a truck, it is therefore possible for the coupling element to be attached as far as possible in the front region and the upward orientation toward the driver's cab is therefore less oblique. The coupling element is attached between an upper, rear section of the driver's cab and a front, preferably end region of the drive train. As a result, a profile which rises obliquely from the front to the rear is obtained. The flatter this profile, the more effective the absorption of tensile forces in the event of collisions. The attachment at the end can be implemented, for example, by means of a corresponding securing part which runs past the front part of the drive engine. The coupling element therefore forms a transverse connection to the front side of the engine, preferably at the level of its greatest strength, which ensures very secure anchoring of the driver's cab. The coupling element can be attached to the engine at, for example, the level of the cylinder head since the latter has a high degree of intrinsic strength and therefore permits large forces to be absorbed in the event of a crash.

According to a further refinement of the invention, the flexible coupling element is a securing cable which is wrapped around the drive engine in a U shape and which is attached by its ends to the lateral longitudinal beams of the chassis of the driver's cab. The flexible coupling element is in this way a single-piece, continuous element which, by virtue of the U-shaped wrapping around the drive engine, ensures reliable anchoring of the driver's cab against forces acting at the front. The manufacture and mounting of the securing cable are conceivably simple. Only the ends of the securing cable have to be attached to the driver's cab and an attachment means for the continuous cable has to be provided on the front side of the engine. This provides, to an equal degree, a cross connection in front of the engine and a bridging of the difference in level between the plane of the driver's cab and the plane of the drive train by means of a single component, specifically the securing cable. It is also not necessary to make any relatively large changes to existing structures since the flexible securing cable is adapted in terms of its profile to the respective spatial conditions.

According to a further refinement of the invention, the coupling element is attached in a rotationally moveably and captive fashion to the sides of the drive train by means of a guide. As a result, the tilting movement of the driver's cab is not impeded and the coupling element remains attached to a predefined position in the front region of the drive train even in the loose, unstressed state. The coupling element is prevented from slipping so that it is always in the position which is optimum in terms of a crash, in particular in the region of high strength of the drive train, such as for example at the level of the cylinder head of the engine.

According to a further advantageous refinement of the invention, the flexible coupling element of the restraint system is attached in a rotationally movable fashion to the driver's cab. A rotationally moveable attachment can be effected, for example, by means of pivot pins which are mounted on the driver's cab. The rotationally movable attachment permits, on the one hand, an unimpeded tilting movement of the driver's cab, and on the other hand, the attachment is only subjected to tensile stress in the direction of the obliquely downward extending coupling element in the case of a collision so that excessive loading of the attachment elements and the risk of rupturing are avoided.

According to a further advantageous refinement of the invention, energy-absorbing crash elements are provided between the driver's cab and the coupling element. If the coupling element is subjected to tensile stress in the case of a collision, at first a mechanical coupling which is resistant to tensile stress is established between the drive train and the driver's cab. When there are very large forces which can no longer be absorbed by the coupling element, the crash elements become deformed starting from a certain value and destroy the applied excess energy. As a result, the flexible coupling element is prevented from rupturing even when there are very large forces, and the connection between the driver's cab/drive train is maintained. In this way it is possible to cope with even relatively high impact speeds by means of the restraint system. The crash elements can be here in any form which is known for this purpose to a person skilled in the art and can be implemented, for example, as deformation elements, active energy-absorbing elements or the like. Alternatively, the coupling element itself can have an extension capability in order to destroy energy through its deformation.

Advantages and features of the invention are explained in the detailed description below in which the invention is described in more detail with respect to the exemplary embodiments illustrated in the appended drawings.

DETAILED DESCRIPTION OF THE INVENTION

Figure 1:
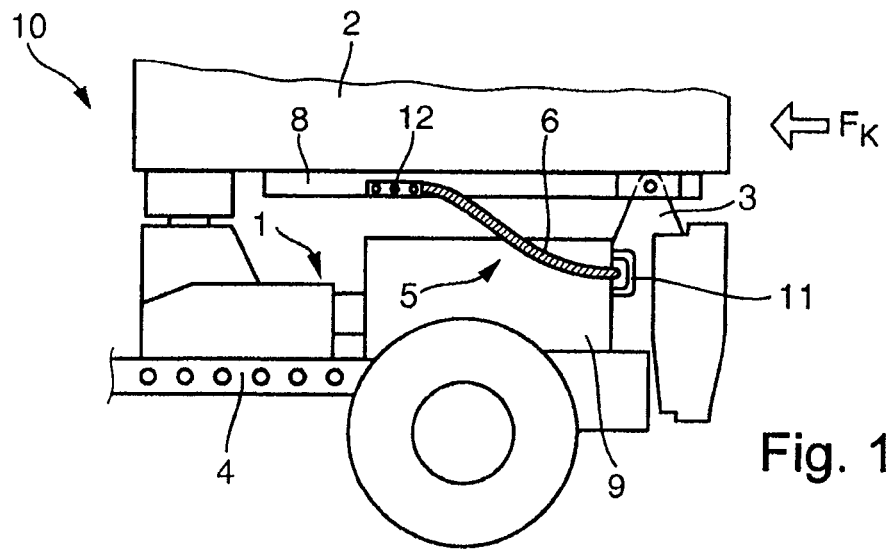
FIG. 1 is a schematic side view of a first exemplary embodiment of a truck according to the invention with a collision restraint system in the form of a securing cable.

FIG. 1 is a schematic side view of a first exemplary embodiment of a truck having a restraint system 5 for the driver's cab 2. The restraint system 5 serves to anchor the driver's cab 2 in the case of head-on collisions of the truck 10 with obstacles at the level of the driver's cab 2, as illustrated by the force arrow $F_K$. In order to prevent the entire collision energy from having to be absorbed by the driver's cab 2 in such cases, in addition to the normal connecting points to the driver's cab, such as the bearing 3, an additional mechanical coupling in the form of a restraint system 5 is provided. This restraint system 5 comprises a flexible coupling element 6 which forms a connection which is resistant to tensile stress counter to the direction of travel, between the driver's cab 2 and a front fixed part of the drive train 1 on a bottom chassis 4. The restraint system 5 is composed in this embodiment of a securing cable 6 which is attached to the driver's cab 2 by means of screws 12 and to the front end of a drive engine 9 by means of a guide 11. The securing cable 6 is fixedly screwed by its ends in each case in a rear region of lateral longitudinal beams 7, 8 to the driver's cab chassis by means of three screws 12 and to an attachment flange. At the engine 9 the securing cable 6 is secured in a tubular guide 11 through which it is guided. The guide 11 forms a captive and rotationally movable bearing of the securing cable 6 at the level of the cylinder head of the drive engine 9, that is to say a region of great strength. As a result, in the case of a head-on collision of the truck, the driver's cab 2 is supported on a highly stable region of the drive train 1 by means of the securing cable 6. The forces $F_K$ which act on the driver's cab 2 are transmitted to the lower lying, stable region of the drive train 1 and are absorbed or deflected by it. The flexible coupling element 6 or securing cable has the advantage that the driver's cab which is at a high position can be bridged with the lower lying drive train 1 without the tilting mobility of the driver's cab 2 or the necessary free oscillation of the drive engine 9 being adversely affected. The flexibility of the coupling element 6 also permits a respectively individually adapted profile depending on the spatial conditions. The coupling element is a continuous securing cable 6 in this exemplary embodiment. However, it can also be composed of a plurality of cable sections which are connected to one another by means of respective intermediate elements. As an alternative to a securing cable 6, straps, chains or other flexible components which are resistant to tensile stress can also be used. The end guide 11 for the securing cable 6 on the engine 9 is implemented here in the form of a holding pipe which is rectangular in cross section and through which the securing cable passes. Other possibilities for securing the securing cable 6 can also be considered.

Figure 2:
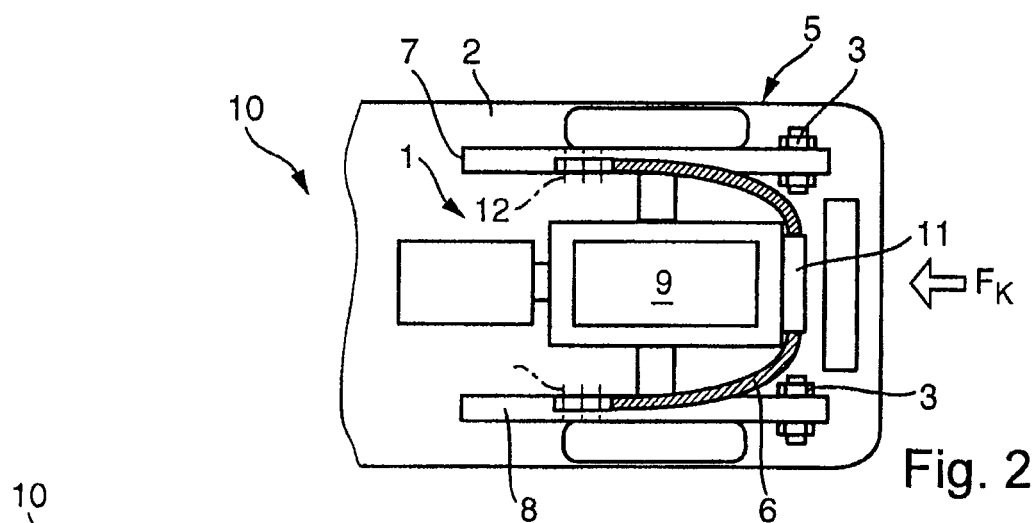
FIG. 2 is a schematic top view of the exemplary embodiment in FIG. 1.

The exemplary embodiment in FIG. 1 is illustrated in a schematic top view in FIG. 2. Here, the U-shaped profile of the securing cable 6 around the end of the drive engine 9 can be seen. The lateral longitudinal beams 7, 8 of the chassis of the driver's cab 2 are respectively arranged on the right and left of the drive train 1 located underneath. Starting from end side attachments by means of screws 12, the securing cable 6 extends obliquely forward in the downward direction and is hooked in at the front side of the drive train 1 by means of a transverse section. The tiltable bearing 3 of the driver's cab 2 is provided here in the same orientation as the front guide 11 of the securing cable 6. As a result, the securing cable 6 pivots essentially about a common axis with the driver's cab 2 when the latter tilts.

Figure 3:
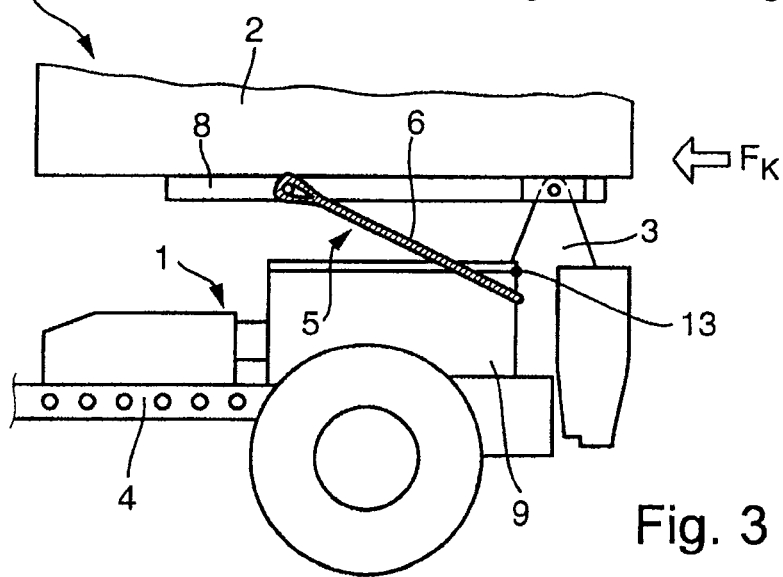
FIG. 3 is a schematic side view of a second exemplary embodiment of a truck according to the invention.

FIG. 3 illustrates an alternative embodiment of a restraint system 5 in a side view. The securing cable 6 has here securing loops for attachment to the longitudinal beams 7, 8, which securing loops are engaged in bolts on the longitudinal beams 7, 8. As a result, the attachment at the driver's cab 2 is also rotationally movable, as a result of which the securing cable 6 can be adapted to the respective orientation. When tensile stress is applied to the securing cable 6 in the event of a crash, the securing cable is therefore in a position with optimum orientation and no mechanical weak points are produced owing to bending at the attachment points. In order to guide the securing cable 6 at the front side of the drive engine 9, laterally projecting securing bolts 13 are provided. The securing bolts 13 prevent the cable 6 from slipping upward in a structurally simple way. The restraint system 5 for the driver's cab 2 can also provide a coupling between the driver's cab 2 and another part of the drive train 1, such as for example the gearbox or the engine bearing. The flexible coupling element 6 can be attached to other fixed structural components of the driver's cab 2 instead of to the longitudinal beams 7, 8 of the driver's cab 2.

The invention claimed is:
1. A truck comprising:
   a driver's cab that is tiltably mounted above a drive train attached to a bottom chassis and coupled in an articulated fashion to said bottom chassis by a bearing,
   a restraint system for the driver's cab operating, during head-on collisions of the truck with an obstacle at the level of the driver's cab, to absorb and deflect collision forces at the driver's cab,
   wherein the restraint system comprises a flexible coupling element secured to an end region of a drive engine that establishes a connection, resistant to tensile stress counter to the direction of travel, between the driver's cab and a front fixed part of the drive train located underneath the driver's cab, and
   wherein the flexible coupling element permits free tilting of the driver's cab about the bearing so that, in an operating state, a possibility of the driver's cab tilting and an intrinsic mobility of the driver's cab and of the drive train is unaffected by the flexible coupling element.
2. The truck as claimed in claim 1, wherein the flexible coupling element is attached to lateral longitudinal beams of the driver's cab.
3. The truck as claimed in claim 1, wherein the flexible coupling element is a securing cable that is wrapped around the drive engine in a U shape and attached at its ends to the lateral longitudinal beams.
4. The truck as claimed in claim 1, wherein the flexible coupling element is attached in a rotationally movable and captive fashion by way of a guide on the end region of the drive engine.
5. The truck as claimed in claim 1, wherein the flexible coupling element is attached in a rotationally movable fashion to the driver's cab.
6. The truck as claimed in claim 1, further comprising energy-absorbing crash elements provided between the flexible coupling element and the driver's cab.
7. The truck as claimed in claim 1, wherein the flexible coupling element is a steel cable.
8. The truck as claimed in claim 1, wherein the flexible coupling element can be stretched in order to dissipate energy.
9. The truck as claimed in claim 2, wherein the flexible coupling element is a securing cable that is wrapped around the drive engine in a U shape and attached at its ends to the lateral longitudinal beams.
10. The truck as claimed in claim 2, wherein the flexible coupling element is attached in a rotationally movable and captive fashion by way of a guide on the end region of the drive engine.
11. The truck as claimed in claim 3, wherein the flexible coupling element is attached in a rotationally movable and captive fashion by way of a guide on the end region of the drive engine.
12. The truck as claimed in claim 2, wherein the flexible coupling element is attached in a rotationally movable fashion to the driver's cab.
13. The truck as claimed in claim 3, wherein the flexible coupling element is attached in a rotationally movable fashion to the driver's cab.
14. The truck as claimed in claim 4, wherein the flexible coupling element is attached in a rotationally movable fashion to the driver's cab.
15. The truck as claimed in claim 2, further comprising energy-absorbing crash elements provided between the flexible coupling element and the driver's cab.

* * * * *